July 30, 1929.  G. R. BOTT ET AL  1,722,490
ANTIFRICTION BEARING
Original Filed Nov. 5, 1923
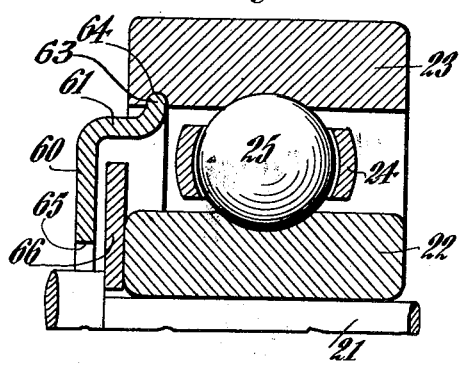
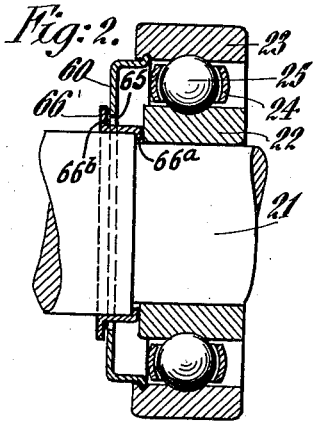
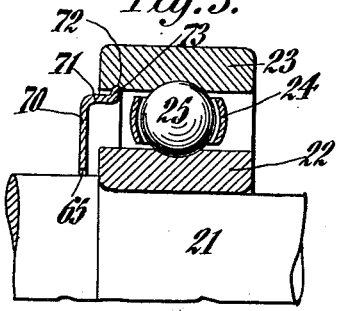
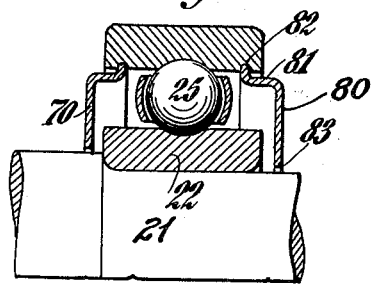
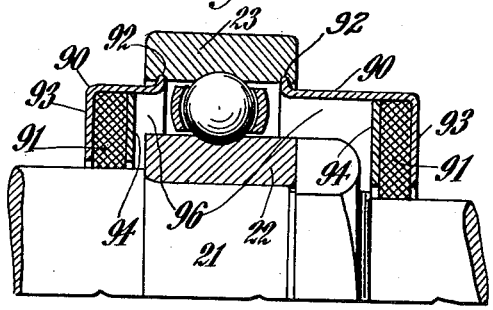
INVENTORS
George R. Bott
Frederick E. Mueller
(DECEASED)
BY
ATTORNEY Patented July 30, 1929.

1,722,490

UNITED STATES PATENT OFFICE.

GEORGE R. BOTT, OF STAMFORD, CONNECTICUT, AND FREDERICK E. MUELLER, DECEASED, LATE OF MOUNT VERNON, NEW YORK, BY KATHERINE M. MUELLER, EXECUTRIX, OF MOUNT VERNON, NEW YORK, ASSIGNORS TO NORMA-HOFFMANN BEARINGS CORPORATION, OF STAMFORD, CONNECTICUT, A CORPORATION OF NEW YORK.

ANTIFRICTION BEARING.

Original application filed November 5, 1923, Serial No. 672,728. Divided and this application filed July 1, 1926. Serial No. 119,814.

This invention relates to anti-friction bearings, and more particularly to a lubricant packed bearing of the type shown and described in the pending application for patent filed by George R. Bott and Frederick E. Mueller, on November 5, 1923, Serial No. 672,728, and of which this application is a division.

As in the said original application, it is the purpose of the invention to provide a simple and efficient means whereby ball or roller bearings when assembled at the place of manufacture, may be packed with a suitable lubricating grease by the application of grease holding or retaining means at one or both sides of the bearing in cooperative relation with one of the bearing race rings to retain the lubricant between said rings and in intimate contact with the balls or rollers and the cage in which the latter may be mounted.

Heretofore, in the manufacture of such bearings it has been customary to furnish to the user the inner and outer race rings with the cage and balls or rollers therein assembled between said rings. The purchaser installed these bearings and then provided separate or additional means for supplying lubricant thereto. Thus, lubrication of the bearings was a secondary problem depending upon the design of the housing which was arranged to take care of the lubricant and to exclude such foreign materials as dirt, grit, dust, etc., which of course, seriously affected the efficient operation of the bearings and eventually caused such wear as to preclude their continued use.

The subject matter of the present application is concerned more particularly with the provision of a dust excluding and lubricant retaining means for ball bearings, which in its latter capacity will be capable of confining or retaining a relatively large body of the lubricant in proximity to the anti-friction bearing members, and which at the same time is so formed and constructed that it may be produced from relatively light sheet metal without liability of a deformation thereof attended by the possible release of the lubricant, and which may be easily and quickly fitted in place or applied in operative relation to the bearing ring and the shaft.

With the above and other objects in view, the invention consists in the improved antifriction bearing, and in the form, construction and relative arrangement of its several parts as will be hereinafter more fully described, illustrated in the accompanying drawings, and subsequently incorporated in the subjoined claims.

In the drawings, wherein several simple and practical embodiments of the invention are illustrated, and in which similar reference characters designate corresponding parts throughout the several views,—

Figure 1 is a fragmentary diametrical section of an anti-friction bearing showing one form of the present invention applied thereto;

Fig. 2 is a similar sectional view of a complete bearing with another form of the improvements operatively associated therewith, and Figs. 3, 4 and 5 are sectional views similar to Fig. 1, each illustrating another alternative embodiment of the invention.

Referring in detail to the drawings, and for the present more particularly to Fig. 1 thereof, the bearing for the shaft indicated at 21 may be of any of the several standard types and as herein shown includes an inner ring 22 fitted upon said shaft to rotate therewith and an outer concentrically related ring 23 which is adapted to be mounted or suitably supported in the opening of a housing wall or other part. These rings are provided in their opposed surfaces with the usual raceways to receive the antifriction bearing members, herein shown in the form of balls 25 mounted for free independent rotation in a suitable cage structure 24. While a conventional closed type of ball bearing is herein shown, it will become evident as this description proceeds that the essential features of the invention are also applicable to open type bearings as well of various constructions commonly known in the art.

The lubricant retaining and dust excluding means constituting the subject matter of this application may be applied to either one or both sides of the bearing as indicated by Figs. 3 and 4 respectively, and in the embodiment thereof as shown in Fig. 1, the said means includes a member 60 of stamped sheet metal. This member is subjected to the pressure of suitable dies to provide an annular body wall bounding a shaft receiving opening 65, and an angular annular section 61 extending laterally in one direction from said body wall at its outer edge and terminating in an outwardly turned flange 63 preferably having a rounded or convex edge for close fitting engagement in a groove 64 provided in the inner face of the outer bearing ring 23 adjacent one of the side faces thereof. In the application of this member, the annular wall section 61 is slightly contracted under pressure in order that the flange 63 may be engaged with the inner face of the ring 23. The member is then forced inwardly axially of the bearing until the edge of said flange is expansibly snapped into the groove 64 as the wall section 61 of said member resumes its normal position. When so applied, it will be observed that the annular body wall 60 of said member is positioned outwardly of and in spaced relation to the side face of the bearing ring and in a plane parallel therewith and together with the laterally extending wall section 61 forms a retaining cup for the lubricant so that a relatively large quantity of the lubricating grease may be packed into the space between the body wall of said member and the bearing elements 25.

It will be noted that the edge of the opening 65 in the member 60 is out of contact with and spaced from the periphery of the shaft 21. In order to effectually prevent the escape of lubricant through this space, a barrier 66 is provided in the form of an annular plate. This plate is positioned within the cup-shaped member 60 and in spaced relation to the body wall thereof and has its inner edge portion confined between the side face of the inner bearing ring 22 and a shoulder or other suitable abutment provided on the shaft 21. Thus the barrier plate will be rigidly fixed or held in position and in conjunction with the member 60 serves to effectually exclude dust and grit from the bearing and at the same time prevent the escape of the lubricant outwardly through the opening 65. The flange 63 of the member 60 being expansibly urged against the wall of the groove 64 provides a substantially fluid tight connection with the outer bearing ring to prevent the escape of the lubricant at the outer side of the member 60. The laterally projecting angular section 61 of this member extending at substantially right angles to the plane of the body wall thereof being slightly contracted from its normal position when said member is applied supplements the resistance of the annular body wall of said member to internal pressures and prevents possible outward bulging or distortion of said wall from its normal condition, notwithstanding the fact that said member may be produced from a relatively light sheet metal plate.

In Fig. 2 of the drawings a somewhat different form of the barrier member 66' is shown, wherein said member consists of a metal ring or annulus positioned through the opening 65 of the member 60 and having at one edge thereof a relatively narrow inwardly projecting flange 66$^a$ to engage over a circumferential shoulder on the shaft 21 and provided at its other edge with a comparatively wide outwardly projecting flange 66$^b$ disposed closely adjacent to the outer face of the member 60 and overlapping the edge of the opening 65 therein. It will be evident that this construction also provides an effective means preventing the escape of the lubricant and excluding the dust and dirt from the bearing.

In Fig. 3 of the drawings, there is shown a member 70 similar in form to the member 60 shown in Fig. 1, and having the laterally extending annular wall section 71 and flange 72 to engage in the groove 73 of the bearing ring. In this case said member 70 serves primarily for the purpose of protecting the bearing against the accumulation of dust and grit thereon, and therefore the edge of the opening 65 in said member is positioned in close proximity to the shaft 21 though out of contact therewith.

In Fig. 4 of the drawings, in addition to the member 70 applied as in Fig. 3 to one side of the bearing, there is also shown a second member 80 having the laterally projecting annular wall section 81 with the outturned flange engaging in a second groove 82 in the inner face of the outer bearing ring. In this case, the body wall of the member 80 extends inwardly beyond the outer face of the inner bearing ring 22 and the edge of the opening 83 of said member is likewise disposed out of contact with the periphery of the shaft 21 but in close proximity thereto.

In Fig. 5 of the drawings, there is shown the two lubricant holding members 90 applied as above explained to opposite sides of the bearing and expansibly held in interlocked connection with the outer bearing ring 23 by engagement with the grooves 92 in the inner face of said ring. A pad 91 of felt or other suitable material is disposed against the inner side of the body wall 93 of each of these members and is engaged upon the periphery of the shaft 21 to thereby prevent the entrance of dust and dirt. An annular plate 94 in each case closely holds said pad against the body wall of the member 90 and in the spaces between these plates and the opposite sides of the movable parts of the bearing as indicated at 96, the lubricating grease is packed.

From the foregoing description considered in connection with the accompanying drawings, the several described embodiments of the invention will be clearly and fully understood. It will be apparent that any one of these several constructions will provide a simple and inexpensive means for enabling the bearings to be initially packed with a relatively large quantity of grease and which likewise protects the movable parts of the bearing against wear due to the collection of dust and grit thereon. Thus, the bearing will be maintained at its maximum operating efficiency for a relatively long period of time.

In the foregoing description and accompanying drawings there is described and shown several practical examples of the essential features of the invention. Nevertheless, it is possible that such features might also be exemplified in still other alternative structural forms and accordingly the privilege is reserved of resorting to all such legitimate changes in the construction and relative arrangement of the several elements as may be fairly embodied within the spirit and scope of the invention as claimed.

We claim:

1. An anti-friction bearing comprising inner and outer rings and anti-friction bearing members arranged between said rings, and a barrier member substantially closing the space between said inner and outer rings at one side of the bearing, said member consisting of a stamped plate of sheet metal having a body wall provided with a shaft receiving opening and an annular marginal section projecting laterally from one side of said wall substantially at right angles to the plane thereof and resiliently contractable and expansible relatively to said wall, and said wall section and the outer bearing ring being provided with cooperating means expansibly held by said wall section in interlocked engagement to thereby sustain said member with the body wall thereof positioned in outwardly spaced parallel relation to one side of the bearing out of contact with the inner bearing ring and with the edge of the opening in said body wall in clearance relation to the periphery of the shaft mounted in said inner bearing ring.

2. An anti-friction bearing comprising inner and outer rings and anti-friction bearing members arrangement between said rings, and a barrier member substantially closing the space between said inner and outer rings at one side of the bearing, said member consisting of a stamped plate of sheet metal having a body wall provided with a shaft receiving opening and an annular marginal section projecting laterally from one side of said wall substantially at right angles to the plane thereof and resiliently contractable and expansible relatively to said wall, said annular wall section having an outwardly turned flange at its edge and said outer bearing ring being provided at its inner face with an annular groove in which said flange is expansibly held by said annular wall section to thereby sustain said member with the body wall thereof positioned in outwardly spaced parallel relation to one side of the bearing out of contact with the inner bearing ring and with the edge of the opening in said body wall in clearance relation to the periphery of the shaft mounted in said inner bearing ring.

3. An anti-friction bearing comprising inner and outer rings and anti-friction bearing members arranged between said rings, and a barrier member substantially closing the space between said inner and outer rings at one side of the bearing, said member consisting of a stamped plate of sheet metal having a body wall provided with a shaft receiving opening and an annular marginal section projecting laterally from one side of said wall substantially at right angles to the plane thereof and resiliently contractable and expansible relatively to said wall, said annular wall section having an outwardly turned flange at its edge and said outer bearing ring being provided in its inner face with an annular groove in which said flange is expansibly held by said annular wall section to thereby sustain said member with the body wall thereof positioned in outwardly spaced parallel relation to one side of the bearing out of contact with the inner bearing ring and with the edge of the opening in said body wall in clearance relation to the periphery of the shaft mounted in said inner bearing ring, said groove being of substantially semicircular form in cross-section and the edge of said flange being rounded or convex.

4. An anti-friction bearing comprising inner and outer rings and anti-friction bearing members arranged between said rings, and a barrier member substantially closing the space between said inner and outer rings at one side of the bearing, said member consisting of a stamped plate of sheet metal having a body wall provided with a shaft receiving opening and an annular marginal section projecting laterally from one side of said wall substantially at right angles to the plane thereof and resiliently contractable and expansible relatively to said wall, said wall section and the outer bearing ring being provided with cooperating means expansibly held by said wall section in interlocked engagement to thereby sustain said member with the body wall thereof positioned in outwardly spaced parallel relation to one side of the bearing out of contact with the inner bearing ring and with the edge of the opening in said body wall in clearance relation to the periphery of the shaft mounted in said inner bearing ring, and a supplemental annular barrier member disposed at the inner side of said body wall substantially closing the opening therein to prevent the ingress of dirt or the egress of lubricant from the space between said first named barrier member and the anti-friction bearing members.

5. An anti-friction bearing comprising inner and outer rings and anti-friction bearing members arranged between said rings, and a barrier member substantially closing the space between said inner and outer rings at one side of the bearing, said member consisting of a stamped plate of sheet metal having a body wall provided with a shaft receiving opening and an annular marginal section projecting laterally from one side of said wall substantially at right angles to the plane thereof and resiliently contractable and expansible relatively to said wall, said wall section and the outer bearing ring being provided with cooperating means expansibly held by said wall section in interlocked engagement to thereby sustain said member with the body wall thereof positioned in outwardly spaced parallel relation to one side of the bearing out of contact with the inner bearing ring and with the edge of the opening in said body wall in clearance relation to the periphery of the shaft mounted in said inner bearing ring, and a second barrier member cooperatively associated with said first named member and having a part substantially closing said opening in the latter member to prevent the ingress of dirt therethrough or the egress of lubricant from the space between the first named barrier member and the anti-friction bearing members.

6. An anti-friction bearing comprising inner and outer rings and anti-friction bearing members arranged between said rings, and a barrier member substantially closing the space between said inner and outer rings at one side of the bearing, said member consisting of a stamped plate of sheet metal having a body wall provided with a shaft receiving opening and an annular marginal section projecting laterally from one side of said wall substantially at right angles to the plane thereof and resiliently contractable and expansible relatively to said wall, said wall section and the outer bearing ring being provided with cooperating means expansibly held by said wall section in interlocked engagement to thereby sustain said member with the body wall thereof positioned in outwardly spaced parallel relation to one side of the bearing out of contact with the inner bearing ring and with the edge of the opening in said body wall in clearance relation to the periphery of the shaft mounted in said inner bearing ring, and a second annular barrier member having a part at one edge thereof adapted to be fixedly confined between one side of the inner bearing ring and the shaft, and said member also having another part in clearance relation to the first named barrier member substantially closing the opening therein to prevent the ingress of dirt therethrough or the egress of lubricant from the space between said latter barrier member and the anti-friction bearing members.

7. In combination with a rotatable member and a bearing therefor, including a fixed bearing ring, a bearing ring rotatable with said member, and a plurality of anti friction members arranged between said rings; an annular lubricant confining plate having one of its edges secured to the inner face of the fixed bearing ring and substantially closing the space between said rings at one side of the bearing to confine a body of lubricant therebetween, and a side plate extending in overlapping relation to the other edge of said lubricant confining plate and in contiguous relation to the inner face of the latter.

8. A ball or roller bearing having an inner race-ring and an outer race-ring provided with a groove at a side of the balls or rollers, a closure member for the space between the two race rings comprising an annular washer having a greater outside diameter than the inner diameter of the outer race-ring and having its outer edge positioned within said groove in the outer race-ring in contactual engagement so as to form a substantially leak-proof joint therewith, said washer having an inner diameter less than the outer diameter of the inner race-ring and having its side outwardly cupped or dished whereby its sides will extend over the outer side of the inner race-ring and have inner edges extending to a position in proximity to but not in contact with a shaft member upon which the inner race-ring is adapted to be mounted, and a second annular washer member secured to the side of the inner race-ring and extending outwardly in proximity to, not in contact but to cooperate with the first washer to form therewith a lubricant chamber.

9. A ball or roller bearing having an inner race-ring and an outer race-ring provided with a groove at a side of the balls or rollers, and a closure member to provide a lubricant chamber for the space between the two race-rings comprising an annular washer having a greater outside diameter than the inner diameter of the outer race-ring and having its outer edge positioned within said groove in the outer race-ring in contactual engagement so as to form a substantially leak-proof joint therewith, said washer having an inner diameter less than the outer diameter of the inner race-ring and having its side outwardly cupped or dished whereby its sides will extend over the outer side of the inner race-ring and have inner edges extending to a position in proximity to but not in contact with a shaft member upon which the inner race-ring is adapted to be mounted.

10. A ball or roller bearing having inner and outer race-rings, a barrier secured to the inner surface of the outer race-ring and extending beyond and outside of the inner race-ring without contacting therewith and extending in proximity to the shaft supporting the ball or roller bearing without contacting therewith.

11. A ball or roller bearing having an inner race-ring and an outer race-ring having an annular groove in its inner surface at a side of the balls or rollers, a barrier formed to spring into said annular groove in the inner surface of the outer race-ring and provided with a laterally bent portion for holding a supply of lubricant and extending beyond and outside of the inner race-ring without contacting therewith and extending in proximity to the shaft supporting the ball or roller bearing.

12. A grease packed bearing unit comprising inner and outer circular members, bearing elements between said members, and an annular side plate secured at one of its edges to one of said members for application to applied position therewith as a part of the bearing unit and having its other edge positioned in laterally spaced relation from the other of said members and of a diameter less than the external diameter of the latter member to confine a mass of lubricant having a volume in excess of the space between the opposed faces of said members at one side of the bearing and in contact with said bearing elements.

13. A grease packed bearing unit comprising inner and outer race rings and a plurality of bearing elements between said rings, an annular plate for confining a body of lubricant in contact with one side of the bearing elements having a volume in excess of the space between the opposed faces of said race rings, the outer edge of said plate being fixedly secured to the outer race ring at one side thereof and said plate at its inner edge having a part laterally offset from the plane of the outer edge of said plate and positioned adjacent to the corresponding side face of the inner race ring and out of contact therewith.

In testimony that we claim the foregoing as the invention of GEORGE R. BOTT and FREDERICK E. MUELLER, deceased, we have signed our names hereto.

GEORGE R. BOTT.
KATHERINE M. MUELLER,
*Executrix of the Last Will and Testament of Frederick E. Mueller, Deceased.*